United States Patent
Erdl et al.

(10) Patent No.: US 9,188,726 B2
(45) Date of Patent: Nov. 17, 2015

(54) LIGHTING DEVICE FOR A MOTOR VEHICLE

(71) Applicant: Bayerische Motoren Werke Aktiengesellschaft, Munich (DE)

(72) Inventors: Helmut Erdl, Flintsbach (DE); Abdelmalek Hanafi, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/256,292

(22) Filed: Apr. 18, 2014

(65) Prior Publication Data

US 2014/0226359 A1     Aug. 14, 2014

Related U.S. Application Data

(63) Continuation of application No. PCT/EP2012/070939, filed on Oct. 23, 2012.

(30) Foreign Application Priority Data

Oct. 28, 2011 (DE) .......................... 10 2011 085 385

(51) Int. Cl.
    *F21V 8/00*      (2006.01)
    *F21S 8/10*      (2006.01)

(52) U.S. Cl.
    CPC ............... *G02B 6/0005* (2013.01); *F21S 48/00* (2013.01); *F21S 48/115* (2013.01); *F21S 48/1154* (2013.01); *F21S 48/1241* (2013.01);
    (Continued)

(58) Field of Classification Search
    CPC .... G02B 6/001; G02B 6/0016; G02B 6/0038; G02B 6/0005; F21S 48/00; F21S 48/115; F21S 48/1241; F21S 48/215; F21S 48/2268
    See application file for complete search history.

(56) References Cited

U.S. PATENT DOCUMENTS 5,791,757 A     8/1998    O'Neil et al.
5,857,770 A *   1/1999    Fohl et al. ..................... 362/511
(Continued)

FOREIGN PATENT DOCUMENTS

DE      102 14 505 A1    10/2003
DE      103 17 062 A1    10/2004
(Continued)

OTHER PUBLICATIONS

German Search Report dated Feb. 20, 2012 with partial English translation (ten (10) pages).
(Continued)

*Primary Examiner* — Stephen F Husar
(74) *Attorney, Agent, or Firm* — Crowell & Moring LLP

(57) ABSTRACT

A lighting device for a motor vehicle, includes a light guide for total-reflective guiding of light along a direction of light propagation. The light originates from at least one light source and can be coupled-in via at least one coupling surface on one end face of the light guide. The light guide further includes a coupling-out surface disposed along the direction of light propagation for coupling out light that exits from the light guide where the total-reflection condition no longer exists at the exit surface disposed along the direction of the light propagation. The lighting device is characterized in that the at least one light source, the light from which can be coupled in on the at least one coupling-in surface, is a laser light source.

24 Claims, 2 Drawing Sheets

(52) U.S. Cl.
CPC ........... *F21S48/215* (2013.01); *F21S 48/2268* (2013.01); *G02B 6/0016* (2013.01); *G02B 6/0038* (2013.01)

(56) References Cited

U.S. PATENT DOCUMENTS

| | | | |
|---|---|---|---|
| 7,706,053 | B2 | 4/2010 | Moosburger |
| 8,070,341 | B2 | 12/2011 | Chinniah et al. |
| 8,256,947 | B2 | 9/2012 | Harle et al. |
| 2004/0066659 | A1 | 4/2004 | Mezei et al. |
| 2006/0002141 | A1 | 1/2006 | Ouderkirk et al. |
| 2008/0232127 | A1* | 9/2008 | Futami ............ 362/511 |
| 2011/0148280 | A1 | 6/2011 | Kishimoto et al. |
| 2012/0039072 | A1* | 2/2012 | Lell et al. ............ 362/227 |
| 2012/0316397 | A1 | 12/2012 | Berben et al. |

FOREIGN PATENT DOCUMENTS

| | | |
|---|---|---|
| DE | 10 2005 038 826 A1 | 3/2007 |
| DE | 10 2006 029 203 A1 | 12/2007 |
| DE | 10 2007 046 611 A1 | 4/2009 |
| DE | 10 2009 054 543 A1 | 9/2010 |
| DE | 10 2010 001 942 A1 | 8/2011 |
| EP | 0 940 625 A2 | 9/1999 |
| GB | 2 323 661 A | 9/1998 |
| WO | WO 2006/007109 A1 | 1/2006 |

OTHER PUBLICATIONS

International Search Report dated Nov. 28, 2012 with English translation (seven (7) pages).

* cited by examiner

LIGHTING DEVICE FOR A MOTOR VEHICLE

CROSS REFERENCE TO RELATED APPLICATIONS

This application is a continuation of PCT International Application No. PCT/EP2012/070939, filed Oct. 23, 2012, which claims priority under 35 U.S.C. §119 from German Patent Application No. 10 2011 085 385.5, filed Oct. 28, 2011, the entire disclosures of which are herein expressly incorporated by reference.

BACKGROUND AND SUMMARY OF THE INVENTION

Nowadays, LED lighting devices are increasingly used in motor vehicles, by means of which suitable light distributions are generated for signal lights or headlights of the vehicle.

LEDs are used in motor vehicles also in combination with optical waveguides, into which the light of the LEDs is coupled and is guided through the optical waveguide. A coupling-out surface is formed in the longitudinal direction of the optical waveguide, which coupling-out surface deflects light in the optical waveguide, so that the light exits by way of an exit surface of the optical waveguide. German Patent document DE 103 17 062 A1 shows an LED lighting device having an optical waveguide, in which lighting device the coupling-out surface coincides with the light exit surface. A light distribution can be generated by use of this lighting device, which extends in the longitudinal direction of the optical waveguide. Because of the low luminance of the LEDs used for generating light, however, only optical waveguides of a limited length and/or of a minimal cross-sectional surface can be used.

It is an object of the invention to create a lighting device for a motor vehicle by which a light distribution can be efficiently generated by using an optical waveguide.

This and other objects are achieved by a lighting device, according to the invention, for a motor vehicle, particularly for a passenger car and optionally also for a commercial vehicle. The device includes an optical waveguide for the totally reflective guiding of light along a light propagation direction, in which case the light originates from at least one light source which is a component of the lighting device. In this case, the light is coupled in by way of at least one coupling-in surface at a face of the optical waveguide, in which case the optical waveguide further includes a coupling-out surface arranged along the light propagation direction for the coupling-out of light from the optical waveguide, so that the decoupled light exits from the optical waveguide on an exit surface arranged along the light propagation direction while the total reflection condition is eliminated. The coupling-out surface and the exit surface therefore also have a dimension transversely to the light propagation direction. The optical waveguide is preferably further developed to be oblong and optionally rod-shaped, in this case, the longitudinal direction of the optical waveguide corresponding to the light propagation direction. The lighting device according to the invention is distinguished by the fact that at least one light source, whose light can be coupled in by way of the at least one coupling-in surface, is a laser light source. This laser light source preferably generates monochromatic light.

The use of a laser light source in combination with optical waveguides has the important advantage that, because of the high luminance of the laser light source, the light can be coupled out with sufficient intensity over long distances in the optical wave guide. Furthermore, optical waveguides with a small cross-section can be installed in the lighting device.

The optical waveguide of the lighting device according to the invention may be constructed in different fashions. In particular, the optical waveguide may be further developed precisely as in the lighting device of German Patent document DE 103 17 062 A1. The entire disclosure of DE 103 17 062 A1 is hereby expressly incorporated by reference as non-essential matter.

In a particularly preferred embodiment, the laser light source of the lighting device is a punctiform light source, and/or a converter device is provided for converting the light of the laser light source to a punctiform light source. The converter device comprises particularly a front lens system and/or a phosphor conversion layer which generates, from monochromatic laser light, a punctiform white light source or a punctiform light source with a wavelength different from that of the laser light. Phosphor conversion layers per se are known from the prior art. For example, in the case of a blue laser light source with an emission wavelength of 450 nm, a phosphor conversion layer of Ce:YAG phosphor can be used for generating white light. For violet laser light with a wavelength of 405 nm, particularly a phosphor conversion layer of cerium-doped nitride phosphor or cerium-doped oxynitride phosphor is used.

Within the meaning of the invention, a "punctiform light source" is a light source having a very small radiating surface which, with respect to the dimensions of the lighting device in a very good approximation can be assumed to be punctiform such that all rays of the light source originate from a single point. The maximal dimension of the punctiform light source in the top view, i.e. in the main radiation direction with the greatest intensity of the light source, in a particularly preferred embodiment, amounts to 500 µm or less, preferably 100 µm or less, and particularly preferably 20 µm or less. Furthermore, in the top view, the punctiform light source preferably has an emitting surface of 0.5 mm$^2$ or less, particularly of 0.01 mm$^2$ or less, and particularly preferably of 0.0002 mm$^2$ or less. The punctiform light source includes particularly an emitting cornered surface whose edges each have a length of 500 µm or less and preferably 20 µm or less. Nevertheless, the punctiform light source may also have a round emitting surface. The punctiform light source with the above-described dimensions is preferably further developed such that it generates a light flux of 100 lm or more and particularly of 200 lm or more and/or has a radiant power of 1 watt or more and/or a luminance of at least $10^8$ Cd/m$^2$ and particularly of $10^9$ Cd/m$^2$ or more. Such punctiform light sources can only be obtained by laser light, for example, by using laser diodes.

In a particularly preferred embodiment, the light of the laser light source and, particularly of the punctiform light source, is converted at the at least one coupling-in surface of the optical waveguide by way of a collimator to a collimated luminous beam. In this case, the collimator may be formed by a curved face, on which the light of the punctiform laser light source is diffracted or reflected. The curved face may form a transmitting lens on which the light of a laser light source provided outside the optical waveguide is incident. Likewise, as required, there is the possibility that the laser light source is arranged in the optical waveguide, for example, in a recess at the coupling-in surface and radiates in the direction of the boundary surface formed by the coupling-in surface between the optical waveguide and the surrounding medium, the light being reflected at this boundary surface and guided back into the optical waveguide as a collimated luminous beam.

In a further embodiment, the lighting device according to the invention is further developed such that, by way of a front lens system, a collimated laser beam is generated from the light of the laser light source. In this case, the laser light source and the front lens system may optionally form a unit for generating the laser beam, which conventionally is also called a laser. The collimated laser beam is coupled by way of the preferably plane coupling-in surface into the optical waveguide, in which case the laser beam is preferably guided to the coupling-in surface by way of a beam deflection. In a very flexible manner, the light of a laser light source can thereby be coupled from different initial positions into the optical waveguide. The installation space in the vehicle can therefore be efficiently utilized. Furthermore, by way of the laser light, a ray beam is generated which has a high luminance and which can also be coupled into optical waveguides of compact dimensions and particularly with a small cross-section and can be guided there over long distances.

In a further, particularly preferred embodiment, the laser light source and, particularly the punctiform light source, is a laser diode. The laser light source preferably is a monochromatic light source whose light is converted by a phosphor conversion layer to white light or to light of a different wavelength than the light of the monochromatic light source, in which case the phosphor conversion layer is particularly arranged in front of the face of the optical waveguide, is mounted in a recess of the optical waveguide, and/or is formed on the coupling-out surface of the optical waveguide. The phosphor conversion layer may optionally also form the coupling-out surface and/or be mounted following the coupling-out surface outside the optical waveguide.

In a further, particularly preferred embodiment, the coupling-out surface has a deflecting device and particularly a prism arrangement or a roughened surface, by way of which light impinging on the coupling-out surface is deflected in the optical waveguide to the exit surface. In this case, the roughened surface may be further developed analogous to that in the optical waveguide of German Patent document DE 103 17 062 A1.

In a particularly preferred embodiment, the deflecting device is further developed such that the intensity of the light exiting by way of the exit surface remains essentially constant along the light propagation direction or longitudinal direction of the optical waveguide, which can be achieved, for example, by a continuous widening of the dimension of the prism arrangement or the roughened surface transversely to the light propagation direction while the distance from the coupling-in surface is increased.

In a further preferred embodiment of the lighting device according to the invention, the exit surface of the optical waveguide is curved in such a manner that collimated light exits from the exit surface. However, an (additional) deflection arrangement, particularly in the form of a reflector and/or of a lens, may be provided, which generates collimated light from the light exiting from the exit surface. In particular, the deflection arrangement described in German Patent document DE 103 17 062 A1 can be used for this purpose.

Depending on the further development, the lighting device may have an optical waveguide with a rectangular or round cross-section. In this case, the maximal dimension of the cross-section preferably is 10 mm or less. However, the optical waveguide may also be further developed such that one edge in the rectangular cross-section of the optical waveguide has a length of 10 mm or more, whereas the other edge has a length of 4 mm or less, so that a laminar optical waveguide is formed. The light exiting takes place particularly essentially perpendicular to the longer edge and essentially parallel to the shorter edge. Particularly, flat optical waveguides can therefore be used in the lighting device according to the invention.

The lighting device according to the invention can be provided for generating arbitrary light distributions. The lighting device is preferably used as a signal light, such as a daytime running light, a marker light, a turn signal light, an indicator light, a tail light and/or a brake light. The lighting device may, however, optionally also form a headlight for the active illumination of the environment of the vehicle, such as a low-beam light or a high-beam light.

In a further variant of the lighting device according to the invention, the coupling-out surface and the exit surface are identical, which is also the case in the lighting device of German Patent document DE 103 17 062 A1.

In addition to the above-described lighting device, the invention further relates to a motor vehicle which includes one or more lighting devices according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
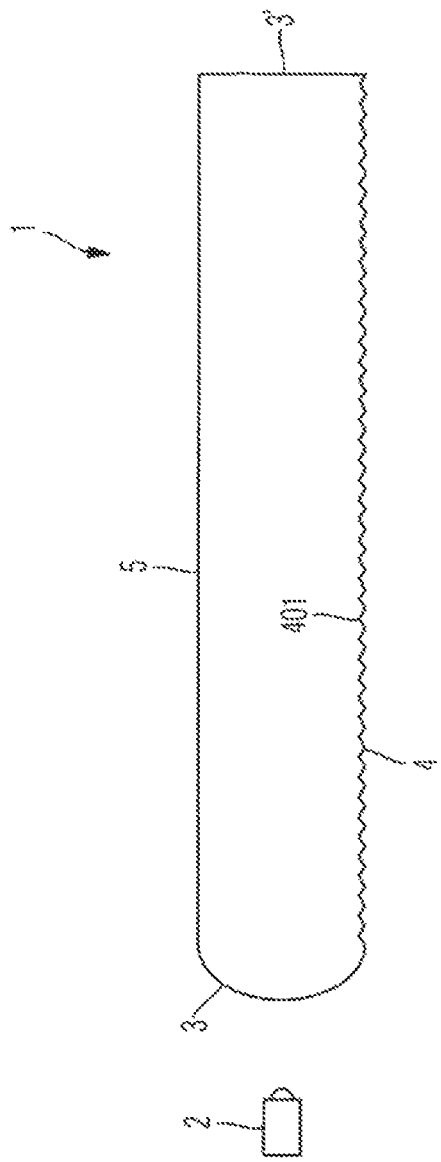
FIG. 1 is a schematic lateral view of an embodiment of a lighting device according to the invention having a laser diode and an optical waveguide.

In the following, an embodiment of the lighting device according to the invention is explained on the basis of an optical waveguide 1 having a rectangular cross-section. This optical waveguide is illustrated in a lateral view in FIG. 1. In a manner known per se, this optical waveguide 1 consists of a transmissive material, such as polycarbonate or Plexiglass, and includes two faces 3 and 3', respectively. The face 3 serves as a coupling-in surface, by way of which the light of a laser diode 2 is guided into the optical waveguide 1. It is essential for the invention that laser light is used for the coupling into the optical waveguide. In this manner, it becomes possible to install light sources with a very high luminance in the lighting device and thereby provide a compact lighting device with a high light efficiency. Compared to the dimensions and, particularly the cross-section, of the optical waveguide, the laser diode can be considered to be essentially punctiform, i.e. the radiation originating from the light source, in a very good approximation, comes from a single point. Because of its curved shape, the coupling-in surface 3 forms a lens in whose focal point the laser diode 2 is arranged. As a result, a collimated laser beam is introduced into the optical waveguide 1. Because of the small dimension of the laser diode 2, the collimation of the beam is very high. As a result of the small dimension of the light source, the coupling-in losses can be minimized particularly in the case of plane cross-sectional surfaces.

In the embodiment of FIG. 1, an arrangement of a plurality of prisms 401 is provided on the underside 4 of the optical waveguide 1; whereas the opposite surface 5 of the optical waveguide is planar. In this case, the surface 4 forms a coupling-out surface for the laser light, which exits from the optical waveguide 1 by way of the exit surface 5. In conventional optical waveguides, where the surface 4 is also planar, light is guided, for example, for the data transport by way of total reflection at the surfaces 4 or 5 through the optical waveguide. In contrast, by way of the prism arrangement 401, a deflecting of the light rays impinging on the prisms in the direction of the exit surface 5 is achieved. The angle at which the deflected luminous radiation is incident on the exit surface 5 is smaller than the total reflection angle, so that the radiation leaves the optical waveguide by way of the exit surface 5.

The arrangement of the prisms 401 is further developed such that the percentage of the coupled-out light from the coupling-in surface 3 to the opposite face 3' increases such that the absolute coupled-out percentage remains constant and therefore light of a constant intensity exits along the longitudinal direction of the optical waveguide. As a result of the increasing percentage of the coupled-out light, the fact is taken into account that, because of the progressive coupling-out by way of the prisms 401, the light intensity decreases along the longitudinal direction of the optical waveguide, so that, for achieving the same intensity, an increasingly larger percentage of light has to be coupled out. In order to achieve an increase of the percentage of the coupled-out light, for example, the dimension of the prisms can increase perpendicularly to the plane of the drawing of FIG. 3, as the distance from the coupling-in surface increases. Likewise, the flanks of the prisms may increase in a suitable manner.

The coupling-out of the light by way of prisms is only one embodiment. In particular, the surface of the coupling-out surface 4 may also be roughened and thereby becomes increasingly larger with an increasing distance from the coupling-in surface, as described in German Patent Document DE 103 17 062 A1. The optical waveguide of DE 103 17 062 A1 differs from the optical waveguide described here in that the coupling-out surface and the exit surface coincide and are situated on the top side of the optical waveguide. This implementation can optionally also be carried out in the optical waveguide according to the invention.

Figure 3:
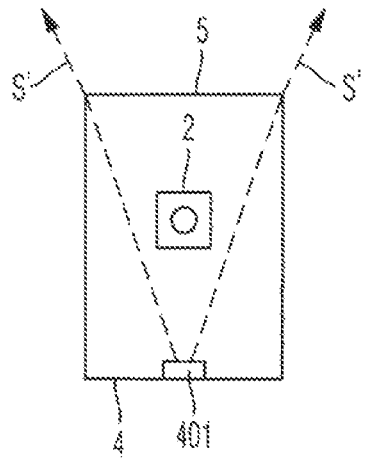
FIG. 3 is a cross-sectional view of the optical waveguide illustrated in FIG. 1.

In the embodiment of FIG. 1, the coupled-out light exits by way of the exit surface 5 in different directions, which is again visible in FIG. 3, which figure is a cross-sectional view from the face 3'. In this case, the cross-section was formed in an area in the proximity of the coupling-in surface 3, which is illustrated by the fact that, in this area, the dimension of the prisms 401 in the horizontal direction on the coupling-out surface 4 is relatively small. It is further illustrated that the coupling-out surface 4 as well as the exit surface 5 are planar. This has the result that radiation reflected at the prisms 401 exits in a different direction from the optical waveguide by way of the exit surface 5, which is outlined as an example by the course S' of the beam in FIG. 3. In order to generate a collimated light beam from the exiting light, in a particularly preferred embodiment, a reflector is used, which has a curvature profile, which is parabolic at least in areas, and in whose focal line the optical waveguide 1 is placed. In this case, the reflector illustrated in German Patent document DE 103 17 062 A1 can be used.

Figure 2:
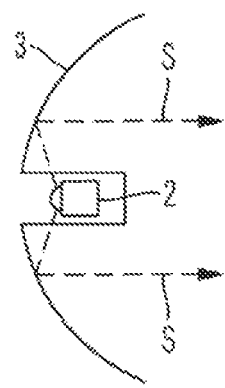
FIG. 2 is an enlarged lateral view of a modification of the embodiment of FIG. 1 in the area of the coupling-in surface.

As explained by way of FIG. 1, the light of the laser diode 2 from the outside is incident on the exterior side of the curved coupling-in surface 3 which, as a result of the curvature, generates a parallel ray beam. FIG. 2 illustrates a modification of this embodiment. This figure provides an enlarged lateral view of the area of the coupling-in surface 3. In contrast to FIG. 1, the laser diode 2 is now positioned in a central bore in the optical waveguide 1 and, in comparison to FIG. 1, radiates in the opposite direction. In this case, the light of the laser diode is reflected on the interior side of the coupling-in surface 3, in which case, analogously to the embodiment of FIG. 1, a parallel ray beam is again generated, which is indicated by the course S of the beam.

Figure 4:
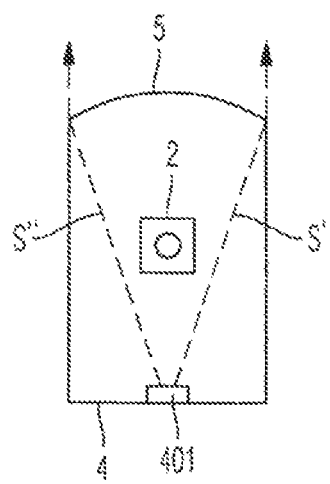
FIG. 4 is a cross-sectional view of a modification of the optical waveguide illustrated in FIG. 1.

FIG. 4 is a view analogous to FIG. 3 of an alternative embodiment of the optical waveguide according to the invention. In this case, the optical waveguide differs from the optical waveguide of FIG. 3 in that the light exit surface 5 is now further developed to be curved, whereby a lens is formed again. The coupling-in surface 4 is situated in the focal plane of this lens, which has the result that the radiation exiting from the surface 5 forms a collimated ray beam, which is outlined by the course S" of the beam. In this embodiment of the invention, an additional reflector for the collimation of the exiting radiation will not be necessary, and the installation space of the lighting device in the vehicle can thereby be reduced.

The spatial dimensions of the optical waveguide 1 of FIG. 1 may differ depending on the application case. Because of the use of a laser light source 2, particularly long optical waveguides of 50 cm and more can be created. Likewise, the cross-section of the optical waveguide may be selected to be very small. In this case, rectangular as well as round cross-sections are usable. In the embodiment of the optical waveguide illustrated in FIG. 3 and FIG. 4 respectively, the latter may, for example, have a height of 8 mm or less and a width of approximately 3 mm or less, for example, 2 mm. In contrast, the radiating surface of the laser diode only has a cross-section of approximately 0.0002 $mm^2$.

The above-described lighting device can take over various functionalities in the motor vehicle. It can be used as a signal light for signaling other traffic participants, or optionally also as a headlight for the active illumination of the environment of the motor vehicle. However, the preferred use is the use as a signal light. Preferably, monochromatic light, such as red light, is generated in this case by way of the laser light source or the laser diode, which light will then exit in this color from the optical waveguide by way of its exit surface. There is also the possibility that the monochromatic light of the laser light source is converted by way of a suitable phosphor conversion layer to a different color or to white light. The phosphor conversion layer may, for example, be positioned in front of the coupling-in surface 3. In this case, the light of the laser diode is incident by way of a focusing lens system on the phosphor conversion layer, whereby a punctiform light source is generated on this layer, whose light subsequently enters into the optical waveguide. Optionally, the coupling-out surface 4 may also contain the phosphor conversion layer, so that the conversion of the monochromatic light to white light or to light of another wavelength takes place during the reflection on the coupling-out surface.

In a variant of the lighting device according to the invention, the ray beam of a laser may also be incident on the coupling-in surface. The laser beam generated by the laser may optionally be directed by way of a suitable deflecting lens system onto the coupling-in surface, so that the laser can flexibly be arranged in different positions and does not have to be positioned directly on the coupling-in surface. As a result, the installation space for the lighting device can be utilized more effectively depending on the application case.

The embodiments of the invention described above have a number of advantages. In particular, significantly higher efficiencies can be achieved in the coupling-in area into the optical waveguide because of the high luminance of a laser light source, and the light propagation in the optical waveguide can be better controlled. In this case, the coupling-out in the optical waveguide can be influenced in a targeted manner by a corresponding surface design of the coupling-out surface and, as a result, a homogeneous light exit can be achieved by way of the exit surface of the optical waveguide. Furthermore, by way of the targeted positioning of the phosphor conversion material, for example, on the coupling-out surface, the color of the light generated by lighting device can be controlled in a simple manner. Because of the high luminance of the beamed-in laser light, it further becomes possible to also implement significantly longer optical waveguides with a sufficient radiation intensity, than can be obtained by use of an LED light source.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lighting device for a motor vehicle, comprising:
    a laser light source;
    an optical waveguide for total reflective guidance of light along a light propagation direction, the optical waveguide having a coupling-in surface on a face thereof, a coupling-out surface arranged along the light propagation direction and an exit surface arranged along the light propagation direction, wherein
    light of the laser light source is coupled-in to the optical waveguide via the coupling-in surface;
    a collimator arranged to convert the light of the laser light source at the coupling-in surface of the optical waveguide to a collimated ray beam, wherein the collimator comprises a curved face of the optical waveguide, on which the light of the laser light source is diffracted or reflected; and
    the coupling-out surface couples out the light at the exit surface where a total-reflection condition does not exist.

2. The lighting device according to claim 1, wherein the laser light source is a punctiform light source.

3. The lighting device according to claim 1, wherein a converter is arranged for converting the light of the laser light source to a punctiform light source.

4. The lighting device according to claim 2, wherein the punctiform light source, in a top view, has a maximal dimension of 500 μm or less.

5. The lighting device according to claim 2, wherein the punctiform light source, in a top view, has a maximal dimension of 20 μm or less.

6. The lighting device according to claim 2, wherein the punctiform light source, in a top view, has an emitting surface of 0.5 mm² or less.

7. The lighting device according to claim 2, wherein the punctiform light source, in a top view, has an emitting surface of 0.0002 mm² or less.

8. The lighting device according to claim 2, wherein the punctiform light source has an emitting cornered surface with edges each having a length of 500 m or less.

9. The lighting device according to claim 2, wherein the punctiform light source at least one of (i) generates a light flux of at least 100 lm and (ii) has a radiant power of at least 1 Watt and a luminance of at least $10^8$ Cd/m².

10. The lighting device according to claim 1, further comprising:
    a front lens system by which the light of the laser light source generates a collimated laser beam, wherein
    the collimated laser beam being coupled into the optical waveguide via a planar coupling-in surface.

11. The lighting device according to claim 10, further comprising:
    a deflector operatively arranged to deflect the collimated laser beam for guiding the laser beam into the optical waveguide.

12. The lighting device according to claim 1, wherein the laser light source is a laser diode.

13. The lighting source according to claim 1, wherein the coupling-out surface of the optical waveguide comprises a deflection device by which light incident on the coupling-out surface is deflected in the optical waveguide to the exit surface.

14. The lighting device according to claim 13, wherein the deflection device is a prism arrangement.

15. The light device according to claim 13, wherein the deflection device is configured such that an intensity of the light exiting via the exit surface is substantially constant along the light propagation direction of the optical waveguide.

16. The lighting device according to claim 1, wherein the optical waveguide has a rectangular cross-section, and wherein a maximum dimension of the cross-section being 10 mm or less.

17. The lighting device according to claim 1, wherein the optical waveguide has a rectangular cross-section, wherein one edge has a length of 10 mm or more and another edge has a length of 4 mm or less.

18. The lighting device according to claim 1, wherein the coupling-out surface and the exit surface are identical.

19. The lighting device according to claim 3, wherein the converter comprises at least one of a front lens system and a phosphor conversion layer which, from monochromatic laser light, generates a punctiform white light source or a punctiform light source of a wavelength differing from the light of the laser light source.

20. The lighting device according to claim 13, wherein the deflection device is a roughened surface.

21. The lighting device according to claim 1, wherein the optical waveguide has a round cross-section, and wherein a maximum dimension of the cross-section being 10 mm or less.

22. A lighting device for a motor vehicle, comprising:
    a laser light source;
    an optical waveguide for total reflective guidance of light along a light propagation direction, the optical waveguide having a coupling-in surface on a face thereof, a coupling-out surface arranged along the light propagation direction and an exit surface arranged along the light propagation direction, wherein
    light of the laser light source is coupled-in to the optical waveguide via the coupling-in surface, and
    the coupling-out surface couples out the light at the exit surface where a total-reflection condition does not exist,
    wherein the laser light source is a monochromatic light source, the lighting device further comprising:
    a phosphor conversion layer configured to convert the monochromatic light from the monochromatic light source to white light or light of a wavelength differing from that of the monochromatic light source, wherein the phosphor conversion layer is configured to be one of:
        arranged in front of the face of the optical waveguide,
        mounted in a recess of the optical waveguide,
        formed on the coupling-out surface of the optical waveguide,
        forming the coupling-out surface of the optical waveguide, and mounted downstream of the coupling-out surface of the optical waveguide.

23. A lighting device for a motor vehicle, comprising:
a laser light source;
an optical waveguide for total reflective guidance of light along a light propagation direction, the optical waveguide having a coupling-in surface on a face thereof, a coupling-out surface arranged along the light propagation direction and an exit surface arranged along the light propagation direction, wherein
light of the laser light source is coupled-in to the optical waveguide via the coupling-in surface, and
the coupling-out surface couples out the light at the exit surface where a total-reflection condition does not exist, wherein the exit surface of the optical waveguide is curved to generate collimated light exiting from the exit surface.

24. A lighting device for a motor vehicle, comprising:
a laser light source;
an optical waveguide for total reflective guidance of light along a light propagation direction, the optical waveguide having a coupling-in surface on a face thereof, a coupling-out surface arranged along the light propagation direction and an exit surface arranged along the light propagation direction, wherein
light of the laser light source is coupled-in to the optical waveguide via the coupling-in surface,
the coupling-out surface couples out the light at the exit surface where a total-reflection condition does not exist; and
a deflecting arrangement configured to generate collimated light from the light exiting from the exit surface of the optical waveguide.

* * * * *